United States Patent
Pitchai et al.

(10) Patent No.: US 9,191,271 B2
(45) Date of Patent: Nov. 17, 2015

(54) FAST TRAFFIC RECOVERY IN VRRP BASED ROUTERS

(71) Applicant: TELEFONAKTIEBOLAGET L M ERICSSON (PUBL), Stockholm (SE)

(72) Inventors: Sridhar Pitchai, San Jose, CA (US); Selvam Ramanathan, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 92 days.

(21) Appl. No.: 13/872,805

(22) Filed: Apr. 29, 2013

(65) Prior Publication Data

US 2014/0321265 A1    Oct. 30, 2014

(51) Int. Cl.
*H04L 12/707* (2013.01)
*H04L 12/24* (2006.01)
*H04L 12/703* (2013.01)
(Continued)

(52) U.S. Cl.
CPC ........ *H04L 41/0668* (2013.01); *G06F 11/2097* (2013.01); *H04L 29/12028* (2013.01); *H04L 41/0654* (2013.01); *H04L 45/22* (2013.01);
(Continued)

(58) Field of Classification Search
CPC ..... H04L 41/0654; H04L 41/06; H04L 12/66; H04L 29/12028; H04L 61/103; H04L 45/586; H04L 69/40; H04L 45/28; H04L 45/00; H04L 43/10; H04L 45/22; H04L 41/0668; G06F 11/2038; G06F 11/2097; G06F 11/2041
USPC ............ 370/220, 397, 255, 392, 395.54, 389, 370/475, 252; 709/238, 223; 711/114
See application file for complete search history.

(56) References Cited

U.S. PATENT DOCUMENTS 6,397,260 B1 * 5/2002 Wils et al. ...................... 709/238
6,775,278 B1 * 8/2004 Britton et al. ................. 370/389
(Continued)

FOREIGN PATENT DOCUMENTS

CN    102647304    8/2012
CN    102711234    10/2012
(Continued)

OTHER PUBLICATIONS

Nadas, S. , "Virtual Router Redundancy Protocol (VRRP) Version 3 for IPv4 and IPv6", http://tools.ietf.org/html/rfc5798.

*Primary Examiner* — Edan Orgad
*Assistant Examiner* — Ivan O Latorre
(74) *Attorney, Agent, or Firm* — Nicholson De Vos Webster & Elliott, LLP

(57) ABSTRACT

A method is implemented by a network device for a fast traffic recovery process for the virtual redundant router protocol (VRRP), where improved speed in a switchover from a master VRRP router to a backup VRRP router is obtained by synchronizing an address resolution protocol (ARP) cache between the master VRRP router and the backup VRRP router such that after the switchover the backup VRRP router functions as a new master VRRP router and does not need to relearn media access control (MAC) address to Internet Protocol (IP) mappings of hosts using the new master VRRP as a gateway. The process involves receiving an ARP entry on an interface of the network device and checking whether the network device is configured as the master VRRP router. The process then sends a gratuitous ARP message to the backup VRRP router in response to the network device being the master VRRP router.

10 Claims, 5 Drawing Sheets

(51) Int. Cl.
  *H04L 29/12* (2006.01)
  *G06F 11/20* (2006.01)
  *H04L 29/14* (2006.01)

(52) U.S. Cl.
  CPC .............. *H04L 45/28* (2013.01); *H04L 61/103* (2013.01); *H04L 69/40* (2013.01)

(56) References Cited

U.S. PATENT DOCUMENTS

| | | | |
|---|---|---|---|
| 7,881,208 B1* | 2/2011 | Nosella et al. | 370/242 |
| 2002/0046271 A1* | 4/2002 | Huang | 709/223 |
| 2005/0257002 A1* | 11/2005 | Nguyen | 711/114 |
| 2005/0265230 A1* | 12/2005 | Na et al. | 370/219 |
| 2006/0062187 A1* | 3/2006 | Rune | 370/338 |
| 2006/0156403 A1* | 7/2006 | Haeffele et al. | 726/23 |
| 2008/0144532 A1* | 6/2008 | Chamarajanagar et al. | 370/255 |
| 2008/0144634 A1* | 6/2008 | Chamarajanagar et al. | 370/397 |
| 2010/0220620 A1* | 9/2010 | Timm et al. | 370/252 |
| 2011/0317700 A1* | 12/2011 | Assarpour | 370/392 |
| 2013/0145002 A1* | 6/2013 | Kannan et al. | 709/223 |
| 2013/0201820 A1* | 8/2013 | Xiaoyong et al. | 370/220 |
| 2014/0198808 A1* | 7/2014 | Zhou | 370/475 |

FOREIGN PATENT DOCUMENTS

| | | | | |
|---|---|---|---|---|
| WO | WO-2005104650 | | 11/2005 | |
| WO | WO 2012/084021 | * | 6/2012 | H04L 12/26 |
| WO | WO 2012/137004 | * | 10/2012 | H04W 36/00 |

\* cited by examiner

FAST TRAFFIC RECOVERY IN VRRP BASED ROUTERS

FIELD

Embodiments of the invention relate to the field of fast network recovery and rerouting. Specifically, the embodiments relate to a system and process for fast traffic recovery with virtual router redundancy protocol (VRRP) by minimizing delay during a switchover caused by rebuilding an address resolution protocol cache.

BACKGROUND

The Virtual Router Redundancy Protocol (VRRP) is a computer networking protocol that defines a process for the automated assignment of available routers to participating hosts. This process improves the availability and reliability of routing paths via automatic gateway selections on an Internet Protocol (IP) subnetwork.

VRRP defines a virtual router, which can be implemented by any one of a set of physical routers. The physical routers can be classified as a master router and a set of backup routers. VRRP assigns a participating host to a gateway that is a virtual router rather than a physical router. If the physical router implementing the virtual router fails, another physical router (i.e., one of the set of backup routers) is automatically selected to take over the execution of the virtual router. The physical router that is implementing the virtual router and forwarding packets at any given time is called the master router.

VRRP provides information on the state of a router, not the routes processed and exchanged by that router. Each VRRP instance is limited, in scope, to a single subnet (e.g., a local area network). VRRP does not advertise routes beyond that subnet or affect the routing outside the subnet. VRRP can be used with Ethernet, multi-protocol label switching (MPLS), and token ring networks. VRRP is described in IETF publication RFC 5798.

SUMMARY

A method is implemented by a network device for a fast traffic recovery process for the virtual redundant router protocol (VRRP), where improved speed in a switchover from a master VRRP router to a backup VRRP router is obtained by synchronizing an address resolution protocol (ARP) cache between the master VRRP router and the backup VRRP router such that after the switchover the backup VRRP router functions as a new master VRRP router and does not need to relearn media access control (MAC) address to Internet Protocol (IP) mappings of hosts using the new master VRRP as a gateway. The process involves receiving an ARP entry on an interface of the network device and checking whether the network device is configured as the master VRRP router. The process then sends a gratuitous ARP message to the backup VRRP router in response to the network device being the master VRRP router.

A network device to implement fast traffic recovery for the virtual redundant router protocol (VRRP), where improved speed in a switchover from a master VRRP router to a backup VRRP router is obtained by synchronizing an address resolution protocol (ARP) cache between the master VRRP router and the backup VRRP router such that after the switchover the backup VRRP router functions as a new master VRRP router and does not need to relearn media access control (MAC) address to Internet Protocol (IP) mappings of hosts using the new master VRRP as a gateway. The network device includes an ingress port defining a network interface, where the network interface is configured to receive data traffic. The network device also includes an egress port to send data traffic and a network processor coupled to the ingress port and egress port. The network processor is configured to execute VRRP and ARP. The network processor is configured to receive an ARP entry on the interface of the network device and check whether the network device is configured as the master VRRP router. The ARP is configured to send a gratuitous ARP message to the backup VRRP router, in response to the network device being the master VRRP router.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DESCRIPTION OF EMBODIMENTS

Figure 1A:
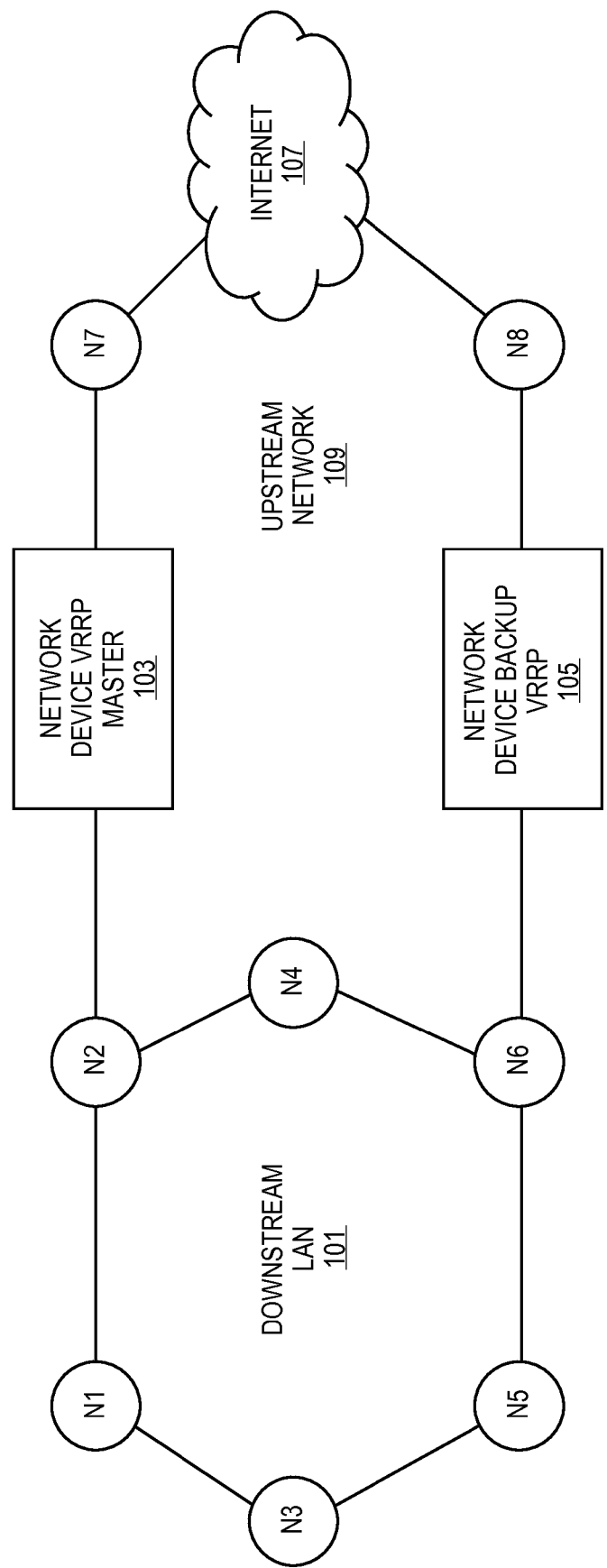
FIG. 1A is a diagram of one embodiment of a network implementing VRRP.

In the following description, numerous specific details are set forth. However, it is understood that embodiments of the invention may be practiced without these specific details. In other instances, well-known circuits, structures and techniques have not been shown in detail in order not to obscure the understanding of this description. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flowcharts will be described with reference to the exemplary embodiment illustrated in the diagrams. However, it should be understood that the operations of flowcharts can be performed by embodiments of the invention other than those discussed with reference to diagrams, and the embodiments discussed with reference to diagrams can perform operations different than those discussed with reference to the flowcharts.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a forwarding plane (sometimes referred to as a data plane or a media plane). In the case that the network device is a router (or is implementing routing functionality), the control plane typically determines how data (e.g., packets) is to be routed (e.g., the next hop for the data and the outgoing port for that data), and the forwarding plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

The embodiments of the invention described herein below provide a method and system for implementing a process to improve switchover time (i.e., shortening the time required for restarting data forwarding after a switchover) in a virtual router redundancy protocol (VRRP) system. The fast recovery is achieved by sending gratuitous address resolution protocol (ARP) messages from a master VRRP router to at least one backup VRRP router, the backup VRRP router's ARP cache is thereby synchronized with the ARP content of the downstream local area network (LAN) collected by the master VRRP router. The master VRRP router has an ARP cache that tracks the mappings of IP addresses to media access control (MAC) addresses of the hosts of the downstream LAN. During VRRP switchover, the backup VRRP router becomes the master VRRP router and the new master VRRP router now has all the MAC addresses of the downstream LAN and the correlated Internet Protocol (IP) addresses, which is necessary for forwarding received traffic destined for hosts in the downstream LAN. Thus, by avoiding having to recreate the ARP cache of MAC to IP address mappings, the process achieves fast traffic recovery during VRRP switchover operations.

The embodiments of the invention overcome the disadvantages of the prior art. During a standard VRRP switchover, the backup VRRP router becomes the master VRRP router and the new Master VRRP router now has to learn the MAC addresses of the downstream LAN. This learning process will cause considerable time delay in forwarding received data traffic and the learning process depends on the number of nodes connected to the downstream LAN. For example, the number of hosts on the downstream LAN could be as high as 1000 hosts. Such a situation makes it impossible to achieve shorter VRRP switchover times such as 300 ms in the actual customer topologies that VRRP is deployed.

VRRP Overview

The Virtual Router Redundancy Protocol (VRRP) is designed to eliminate the single point of failure inherent in the static default routed environment. VRRP specifies an election protocol that dynamically assigns responsibility for a virtual router to one of the VRRP routers on a LAN. The VRRP router controlling the IP address associated with a virtual router is called the Master, and forwards packets sent to these IP addresses. The IP address associated with the virtual router are referred to herein as 'virtual IP.' The election process of master and backup VRRP routers provides dynamic switchover in the forwarding responsibility should the master VRRP router become unavailable. In the case of such a failure, the backup VRRP router automatically becomes the master VRRP router and executes the responsibilities of the master VRRP router.

The master VRRP router functions as the forwarding router for the IP address associated with the virtual router (i.e., the 'virtual IP' address). While functioning as the master VRRP router, the VRRP router must do the following: (1) respond to ARP requests for the IP address associated with the virtual router. (i.e., the virtual IP address); and forward packets with a destination link layer MAC address equal to the virtual router MAC address.

FIG. 1A is a diagram of one embodiment of a network implementing VRRP. In the example embodiment, two physical routers (i.e., network devices 103, 105) are shown. One network device 103 operates as the master VRRP router, while the other network device 105 operates as the backup VRRP router. One skilled in the art would understand that a network can have any number of network devices that operate as VRRP routers, with only one operating as the master VRRP router at any given time. For sake of clarity, the example embodiments show two VRRP router systems. However, the principles and structures described herein also apply to system with any number of VRRP routers. VRRP defines a priority process that determines which of the backup VRRP routers assumes the master VRRP router role in response to any failure.

In the example, the downstream LAN 101 includes a set of nodes N1-N6 (i.e., hosts) that can be any type of computing devices such as desktop computers, servers, handheld devices, wireless devices and similar devices that are connected to the downstream LAN 101 and which utilize the VRRP routers as their default gateway. The downstream LAN 101 can be any type of network such as an Ethernet, token ring or MPLS network. Any number of hosts can be connected to the downstream LAN 101. The master VRRP 103 functions as a gateway for the downstream LAN 101 with an upstream network 109 such as a wide area network (e.g., the Internet 107) or similar network. The upstream network 109 can have any size, number of constituent nodes, media (e.g., Ethernet, MPLS, IP or similar networking protocols) and similar characteristics. As data traffic is exchanged between the upstream network 109 and the downstream network 101, the master VRRP learns via address resolution protocol (ARP), which MAC addresses of the host correspond to IP addresses of received data traffic. The MAC address to IP address mapping is maintained in an ARP cache of the master VRRP router 103. In the embodiments, described further herein below, the ARP cache of the master VRRP router 103 is synchronized or shared with an ARP cache of the backup VRRP router 105 to enable it to immediately handle data traffic forwarding after a switchover without having to relearn the ARP cache mappings.

Figure 1B:
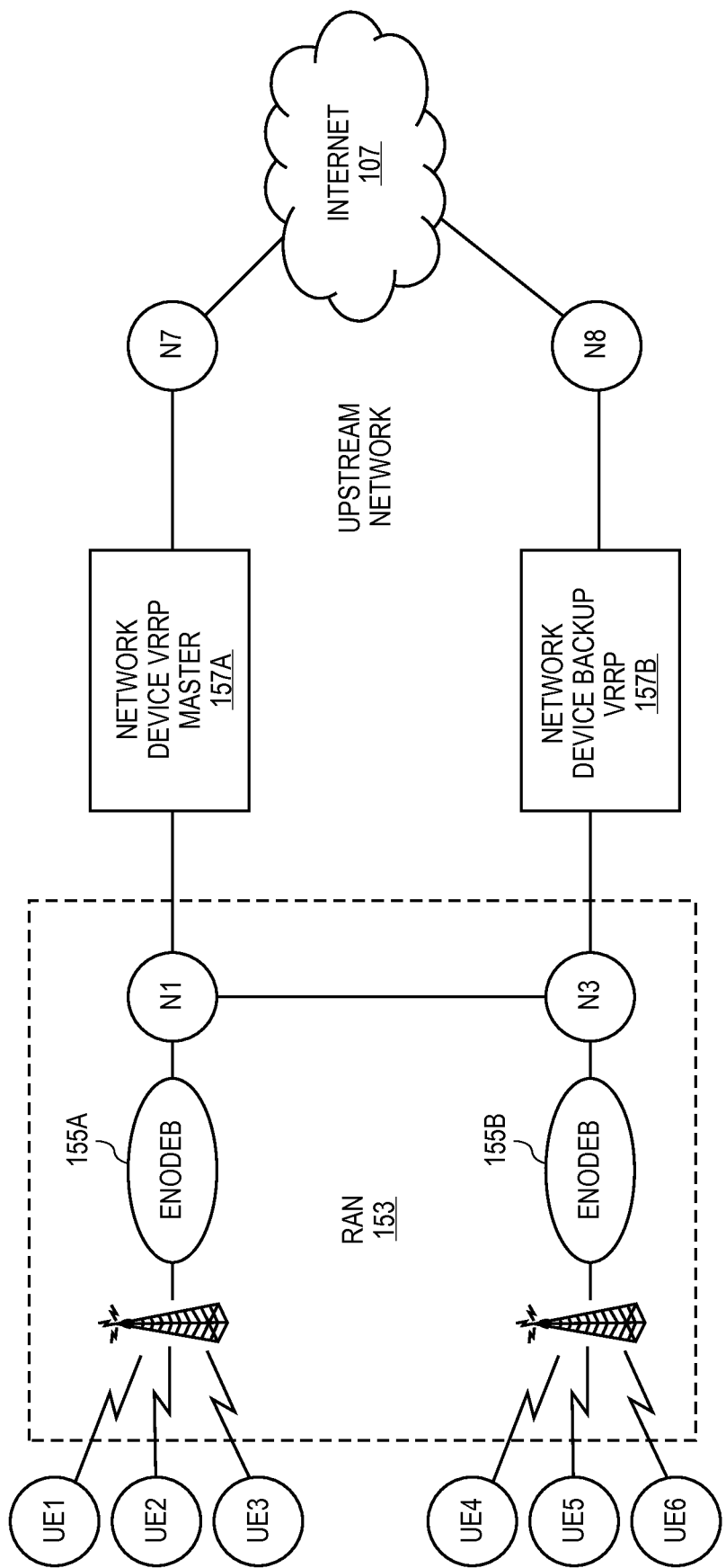
FIG. 1B is a diagram of another embodiment of a network implementing VRRP.

FIG. 1B is a diagram of another embodiment of a network implementing VRRP. In this alternate embodiment, VRRP is implemented in support of a radio access network (RAN) 153 or similar telecommunications system. The RAN 153 includes a set of enodeBs 155A, 155B that communicate with user equipment 151 to provide network connectivity to the user equipment 151. The RAN can include any number of enodeBs 155A,B or equivalent networking devices, which provide connectivity via communication towers with to any number of user equipment 151. The enodeBs 155A, B can be directly or indirectly connected with the master and backup VRRP network devices 157A, B. As with the previous example network configuration, the master VRRP router 157A and the backup VRRP router 157B serve the downstream RAN and the attached hosts 151 as a gateway for a wide area network, for example the Internet 161. The upstream network can include any number of nodes (i.e., network devices or other computing devices) and can communicate over any medium or protocol.

The user equipment 151 that is attached to the RAN 153 can be any type of cellular device such as a smartphone, tablet, laptop or similar devices with a cellular transceiver. These devices are hosts in the network serviced by the VRRP routers 157A, B. The master VRRP router 157A maintains an ARP cache of the MAC to IP address mappings for the user equipment 151. The backup VRRP router 157B maintains a synchronized ARP cache or similarly shares the master VRRP router 157A ARP cache information to enable a fast switchover in the event of a failure at the master VRRP router 157A.

Figure 2A:
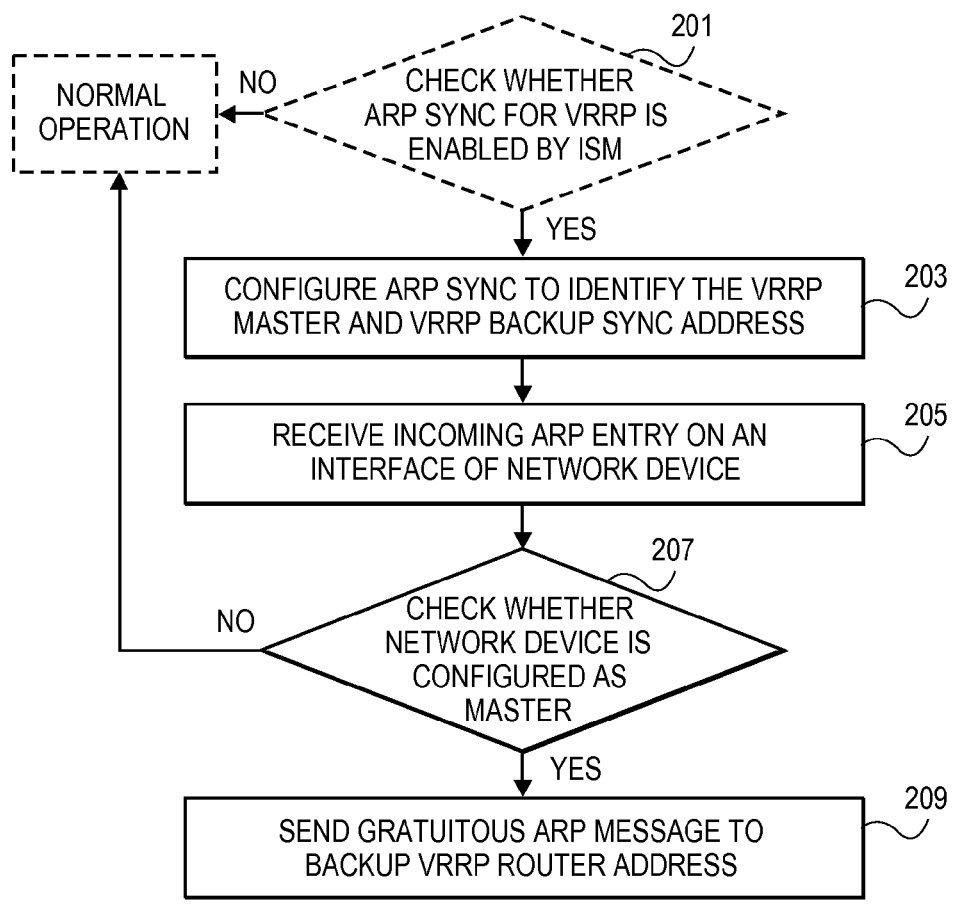
FIG. 2A is a flowchart of one embodiment of a process for providing a backup VRRP router with gratuitous ARP information.

FIG. 2A is a flowchart of one embodiment of a process for providing a backup VRRP router with gratuitous ARP information. In one embodiment, this process is executed by the current master VRRP router for a subnet or similar network configuration. The functionality can be implemented by VRRP functions and/or ARP functions that have been configured to support this functionality. The process can be initiated at the start-up of the network device (i.e., a physical router) implementing the master VRRP router or in response to any action configuring the execution of the process by an administrator or similar event.

The interface service module (ISM) process checks whether ARP synchronization for VRRP has been enabled for the network device implementing the master VRRP router (Block 201). If the ARP synchronization for VRRP is not enabled, then the normal VRRP process is implemented until the configuration changes or the network device restarts. If the ARP synchronization for VRRP is enabled, then the ARP synchronization is configured to identify the VRRP backup and VRRP master synchronization addresses (Block 203). For example, the ARP synchronization can be configured at the interface level. In one example embodiment, the configuration would look like this in the first physical router that starts as the master VRRP router:

```
interface ge1-1-vlan-1
ip address 10.1.1.1/24
ip arp synchronization 10.1.1.50
vrrp 1 backup
virtual-address 10.10.10.100
advertise-interval 1
```

Whenever ARP synchronization (also referred to as 'IP ARP synchronization') is enabled on an interface, ISM will update the ARP process, during the circuit configuration message. Once configured, the process awaits receipt of an incoming ARP entry on an interface of the network device (Block 205). Such an entry can be received in response to an ARP broadcast request message to resolve a MAC address of a received packet with an IP address without a mapped MAC address in the ARP cache. Upon receipt of the ARP entry, a check is made whether the network device is currently configured as the master VRRP router (Block 207). If the network device is not the current master VRRP router, then normal operation of the VRRP and ARP continues. If the network device is the master VRRP router, then when there is an ARP entry learnt via an interface of the network device, the ARP process will send out the proxy ARP gratuitous packet to the defined ip-arp-synchronization host (i.e., IP address 10.1.1.50 in this example), which is the backup VRRP router address (or at least one of the set if more than one is in the set).

In the example, the interface address is 10.1.1.1/24 and this interface is doing the ARP synchronization with 10.1.1.50, the interface receives a new ARP entry (i.e., an ARP resolution), which is 10.1.1.20 and its MAC is 0x050505050505. Then the proxy ARP gratuitous packet will look like the following:

```
07 07 07 07 07 07 00 07 0d af f4 54 08 06 00 01 08 00 06 04
00 01 00 07 0d af f4 54 0a 01 01 01 05 05 05 05 05 05 0a 01 01 64
    where the
    components include,
    07 07 07 07 07 07    (DST MAC address of 10.1.1.50)
    00 07 0d af f4 54    (SRC MAC of the interface ge1-1-vlan-1)
    08 06                (PAK type ARP)
    00 01                (hw type ether)
    08 00                (proto type IP)
    06                   (hw size)
    04                   (proto size)
    00 01                (opcode for update)
    00 07 0d af f4 54    (senders mac)
    0a 01 01 01          (senders ip)
    05 05 05 05 05 05    (target MAC)
    0a 01 01 14          (target IP)
```

The ARP gratuitous packet is spoofed by the interface 10.1.1.1, for an update for 10.1.1.20 to 10.1.1.50. This will result in an ARP entry being installed on backup VRRP router in its ARP cache.

A sample Configuration on the backup VRRP router:

```
    interface ge1-1-vlan-2
    ip address 10.1.1.50/24
    ip arp synchronization 10.1.1.1
    vrrp 1 backup
    virtual-address 10.10.10.100
    advertise-interval 1
```

Figure 2B:
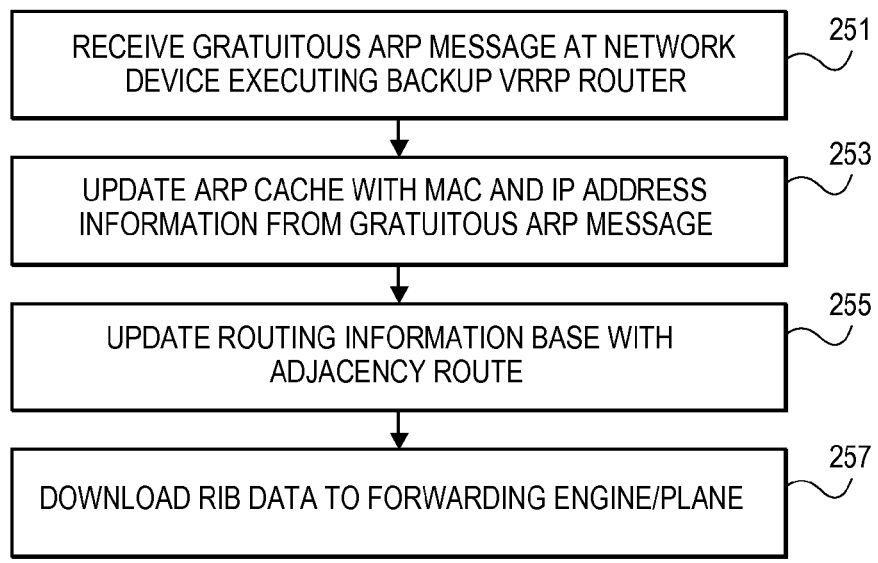
FIG. 2B is a flowchart of one embodiment of a process for receiving the gratuitous ARP information at the backup VRRP router.

FIG. 2B is a flowchart of one embodiment of a process for receiving the gratuitous ARP information at the backup VRRP router. In one embodiment, this process is initiated in response to receiving a gratuitous ARP message at the network device functioning as the backup VRRP router (Block 251). The ARP process responds by updating the ARP cache with the MAC address and IP address information from the gratuitous ARP message thereby mapping them to one another (Block 253). In some embodiments, the process can continue by being forwarded to the routing information base (RIB) of the backup VRRP router to establish an adjacency route (Block 255). From the RIB the information can further be utilized to populate the forwarding information base (FIB) of the forwarding plane and utilized by the forwarding engine to forward further received data traffic with the destination IP address having been mapped by the gratuitous ARP message with a specific MAC address. The ARP message that initiates this process can be utilized by the master VRRP router for ARP cache synchronization and/or ARP refresh, as discussed further herein below.

Figure 3:
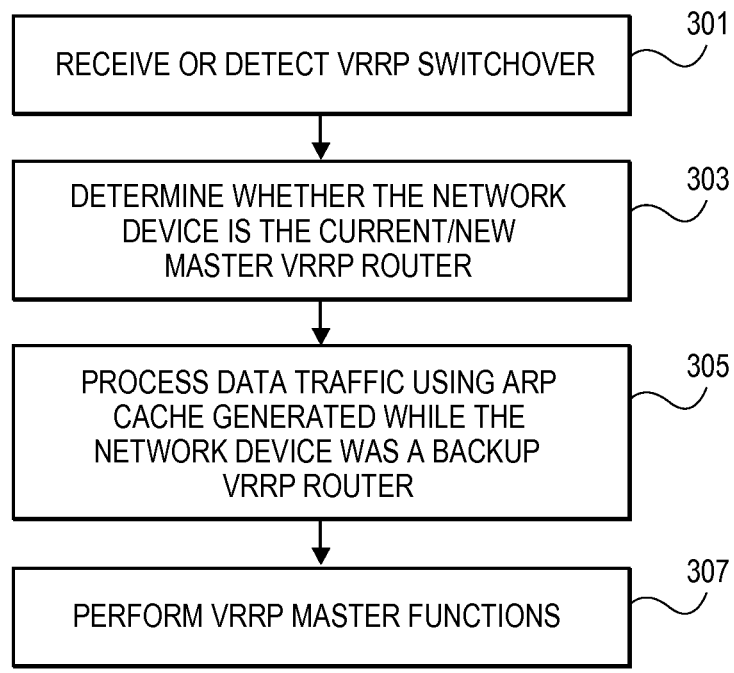
FIG. 3 is a flowchart of one embodiment of a process for a VRRP switchover operation.

FIG. 3 is a flowchart of one embodiment of a process for a VRRP switchover operation. The switchover operation can be implemented by each of the set of backup VRRP routers, which either receive notice or detect VRRP switchover to initiate this process (Block 301). A switchover message can be generated by the master VRRP router if it is gracefully failing or restarting. In other embodiments, the backup VRRP routers detect a lack of response to messages from the master VRRP router or use a similar mechanism for detecting master VRRP router failure. Each backup VRRP router then determines whether that network device is the new/current master VRRP router using a common deterministic algorithm, such as a shared order or priority, such that each backup router determines that the same network device has become the new/current master VRRP router. (Block 303). For the network device that has become the new/current master VRRP router, the process continues as data traffic then arrives is processed using the ARP cache that has been synchronized by the gratuitous ARP messages sent by the prior master VRRP router. This transition, because of the synchronized ARP cache can forward received data within 300 ms of the switchover, which is an improvement over scenarios where no synchronization is performed and switchover can take significantly more time than 300 ms. The new/current master VRRP router then must perform all of the master VRRP router functions (Block 307). These master VRRP router functions include the synchronization of the ARP cache with the other backup VRRP routers, as described herein above.

Figure 4:
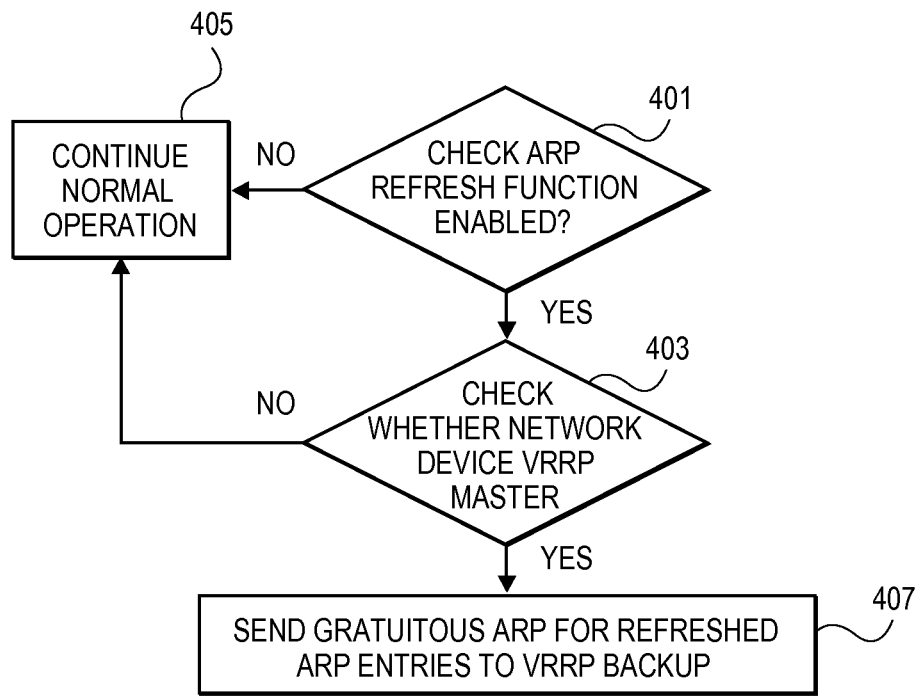
FIG. 4 is a flowchart of one embodiment of a process for a VRRP refresh operation.

FIG. 4 is a flowchart of one embodiment of a process for a VRRP refresh operation. In some scenarios, the ARP synchronization can utilize a refresh operation. The refresh operation is intended to ensure that the ARP cache of the back VRRP routers stays current with the ARP cache of the master VRRP router. In some configurations, old or stale ARP cache entries may be flushed or otherwise lost at the backup VRRP router, because the backup ARP router is not receiving data traffic and thus, the ARP cache is unused, causing some configurations to mark the ARP cache data as stale. To avoid the loss of the synchronized data, the master VRRP router can be configured to execute an ARP refresh operation.

The configuration of the master VRRP router can be checked at the startup of the network device or after any configuration or similar trigger (Block 401). If the VRRP is not configured to perform refresh operations or the network device is implementing a backup VRRP, then the normal operation of the VRRP router continues (Block 405). If the VRRP router is configured to perform ARP refresh operations, then a check is made to determine whether the network device is the master VRRP router (Block 403). If the VRRP router is a backup, then the normal operation of the backup VRRP router continues (Block 405). However, if the network device is configured to do ARP refresh operations and the network device is executing the current master VRRP router, then the master VRRP router can at defined intervals send a set of gratuitous ARP messages to the set of backup VRRP routers for each of the ARP entries to be refreshed (Block 407). The interval can be set to be within any timeout interval utilized by the backup VRRP to clear ARP cache entries.

Figure 5:
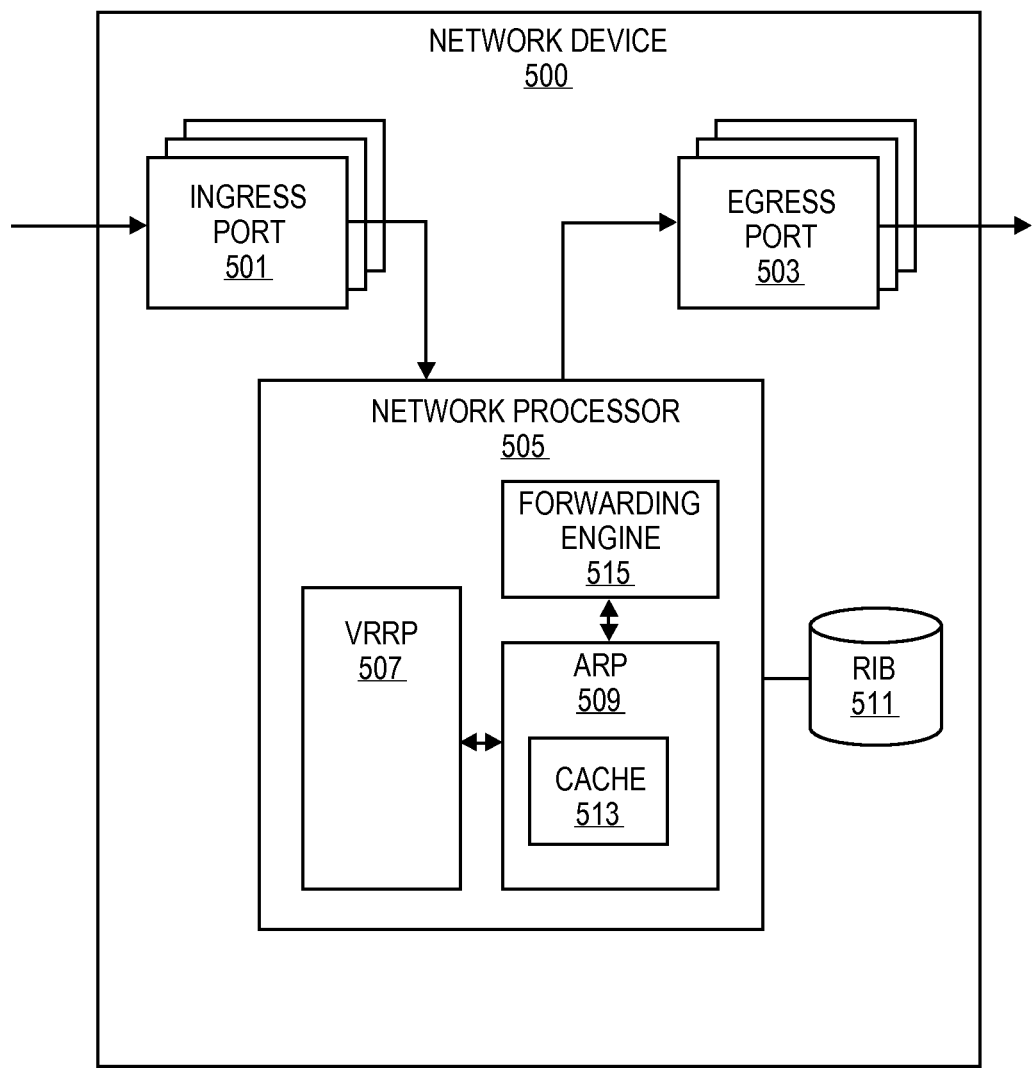
FIG. 5 is diagram of one embodiment of a network device implementing the VRRP functions.

FIG. 5 is diagram of one embodiment of a network device implementing the VRRP functions. The network device 500 can be any type of networking device such as a router or similar network device as further discussed herein above. The network device 500 can be connected to any number of other devices over any number of connections through a set of ingress ports 501 and egress ports 503. In some embodiments, communication is bidirectional over each port or a subset of the ports. The ingress ports 501 and egress ports can be implemented or serviced by line cards, a set of general network processors or by a similar architecture of a network device.

A set of network processors 505 can implement the functionality of the VRRP 502, ARP 513 and forwarding and/or control plane via a forwarding engine 515 or through similar implementations. The VRRP 507 and ARP 509 can function to implement the processes described herein above. A separate storage unit or internal storage of the network processor 505 can stored the routing information base (511). The forwarding information base (not shown) could be implemented in greater proximity to the egress ports (503). In other embodiments, the VRRP and ARP functions can be implemented in line cards of the network device rather than a general network processor, which is provided by way of example rather than limitation. In such cases the FIB is present specific to the line card and the RIB is generic to the network device.

The VRRP 507 can implement all or and subset of the functions defined by VRRP including the ARP synchronization process described above. The implementation of the ARP synchronization process is distributed over the VRRP and the ARP. The VRRP configures the ARP synchronization and determines the current master status and implements other similar processes of the protocol. The ARP 509 can implement the sending and receiving of ARP messages including gratuitous ARP messages used by the master VRRP router to implement ARP synchronization and ARP refresh operations. In this manner, the ARP maintains a MAC to IP address mapping an ARP cache 573, which can be stored in any memory space in either the network processor 505 or within the network device 500.

The forwarding engine 515 receives data traffic and looks up the MAC address associated with an IP address in the destination filed. This information can be derived from the ARP cache 513, but has been promulgated from the ARP cache 513, to the RIB and ultimately to the FIB of the egress ports where the egress port forward the data traffic over the link associated with the path that leads to the destination either on a downstream of upstream network.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to implement a fast traffic recovery for virtual redundant router protocol (VRRP), where improved speed in a switchover from a master VRRP router to a backup VRRP router is obtained by synchronizing an address resolution protocol (ARP) cache between the master VRRP router and the backup VRRP router such that after the switchover the backup VRRP router functioning as a new master VRRP router does not need to relearn media access control (MAC) address to Internet Protocol (IP) mappings of hosts using the new master VRRP as a gateway, the method comprising the steps of:

receiving an ARP entry on an interface of the network device, wherein the ARP entry maps an IP address of a host to a MAC address of the host;

checking whether the network device is configured as the master VRRP router; and sending a gratuitous ARP message to the backup VRRP router, in response to the network device being the master VRRP router, wherein the gratuitous ARP message includes a MAC address of the master VRRP router in a sender MAC field, the MAC address of the host in a target MAC field, and the IP address of the host in a target IP field.

2. The method of claim 1, further comprises the step of:
configuring ARP synchronization to identify the VRRP master and VRRP backup synchronization addresses.

3. The method of claim 1, further comprising the step of:
checking whether ARP synchronization is enabled for the network device.

4. The method of claim 1, further comprises the step of:
processing data traffic after a switchover using the ARP cache having ARP entries obtained by ARP synchronization between the master VRRP router and the backup VRRP router.

5. The method of claim 1, further comprises the step of:
sending another gratuitous ARP message to the backup VRRP router to refresh ARP entries in the ARP cache of the backup VRRP router.

6. A network device to implement a fast traffic recovery for virtual redundant router protocol (VRRP), where improved speed in a switchover from a master VRRP router to a backup VRRP router is obtained by synchronizing an address resolution protocol (ARP) cache between the master VRRP router and the backup VRRP router such that after the switchover the backup VRRP router functioning as a new master VRRP router does not need to relearn media access control (MAC) address to Internet Protocol (IP) mappings of hosts using the new master VRRP as a gateway, the network device comprising:

an ingress port defining a network interface, the network interface to receive data traffic;

an egress port to send data traffic; and a network processor coupled to the ingress port and egress port, the network processor configured to execute VRRP and ARP, the network processor configured to receive an ARP entry on the interface of the network device, wherein the ARP entry maps an IP address of a host to a MAC address of the host, the network processor further configured to check whether the network device is configured as the master VRRP router, and the ARP configured to send a gratuitous ARP message to the backup VRRP router, in response to the network device being the master VRRP router, wherein the gratuitous ARP message includes a MAC address of the master VRRP router in a sender MAC field, the MAC address of the host in a target MAC field, and the IP address of the host in a target IP field.

7. The network device of claim 6, wherein the network processor is further configured to execute ARP synchronization configuration to identify the VRRP master and VRRP backup synchronization addresses.

8. The network device of claim 6, wherein the network process or is further configured to check whether ARP synchronization is enabled for the network device.

9. The network device of claim 6, wherein the network processor is further configured to process data traffic after a switchover using the ARP cache having ARP entries obtained by ARP synchronization between the master VRRP router and the backup VRRP router.

10. The network device of claim 6, wherein the network processor is further configured to send another gratuitous ARP message to the backup VRRP router to refresh ARP entries in the ARP cache of the backup VRRP router.

\* \* \* \* \*